(12) United States Patent
Langley

(10) Patent No.: US 7,835,548 B1
(45) Date of Patent: Nov. 16, 2010

(54) METHOD AND SYSTEM FOR CONDUCTING IDENTITY MATCHING

(75) Inventor: Richard Jay Langley, Vienna, VA (US)

(73) Assignee: Daon Holding Limited, George Town (KY)

( * ) Notice: Subject to any disclaimer, the term of this patent is extended or adjusted under 35 U.S.C. 154(b) by 0 days.

(21) Appl. No.: 12/870,870

(22) Filed: Aug. 30, 2010

Related U.S. Application Data

(63) Continuation of application No. 12/714,568, filed on Mar. 1, 2010.

(51) Int. Cl.
*G06K 9/00* (2006.01)

(52) U.S. Cl. .................. 382/116; 340/5.82; 382/160

(58) Field of Classification Search ............... 382/115, 382/116, 117, 118, 119, 124, 159, 160; 340/5.1, 340/5, 52, 5.53, 5.82, 5.83, 5.84
See application file for complete search history.

(56) References Cited

U.S. PATENT DOCUMENTS

| | | | |
|---|---|---|---|
| 5,229,764 A | 7/1993 | Matchett et al. | 340/825.34 |
| 6,950,536 B2 | 9/2005 | Houvener | 382/116 |
| 7,242,810 B2 | 7/2007 | Chang | 382/227 |
| 7,287,013 B2 | 10/2007 | Schneider et al. | 706/15 |
| 7,492,943 B2 | 2/2009 | Li et al. | 382/159 |
| 7,558,407 B2 | 7/2009 | Hoffman et al. | 382/115 |
| 7,558,765 B2 | 7/2009 | Kiefer | 706/15 |
| 7,616,788 B2 | 11/2009 | Hsieh et al. | 382/124 |
| 2006/0021003 A1 | 1/2006 | Fisher et al. | 726/1 |
| 2006/0171571 A1 | 8/2006 | Chan et al. | 382/115 |
| 2006/0222211 A1 | 10/2006 | Olivo, Jr. et al. | 382/115 |
| 2007/0036400 A1 | 2/2007 | Watanabe et al. | 382/124 |
| 2007/0050636 A1 | 3/2007 | Menczel et al. | 713/186 |
| 2007/0183625 A1 | 8/2007 | Dussich et al. | 382/100 |
| 2007/0189585 A1 | 8/2007 | Sukegawa et al. | 382/118 |
| 2007/0239991 A1 | 10/2007 | Cheng | 713/186 |
| 2007/0288452 A1 | 12/2007 | Podilchuk | 707/5 |
| 2008/0192988 A1 | 8/2008 | Uludag et al. | 382/115 |

(Continued)

OTHER PUBLICATIONS

Benchmarking Quality-Dependent and Cost-Sensitive Score-Level Multimodal Biometric Fusion Algorithms,Poh et al.,Info. Forensics and Security,Dec. 2009, vol. 4, No. 4, pp. 849-866.

(Continued)

*Primary Examiner*—Andrew W Johns
(74) *Attorney, Agent, or Firm*—Kevin McDermott, Esq.

(57) ABSTRACT

A method of managing large scale biometric data identity matching includes identifying a plurality of biometric modalities to be used in conducting identity matches, determining one of the biometric modalities to be a primary biometric modality and determining whether at least one matching algorithm is compatible with matrix entries. When the at least one matching algorithm is compatible with a matrix entry the method includes assigning a plurality of matching systems to the matrix entry. The matching systems are configured to conduct 1:1 or 1:few matching after conducting a 1:N identity matching. Furthermore, the method includes comparing a probe against enrollment data records stored in a corresponding matching system, and storing information regarding a matching enrollment data record in a queue when the probe matches an enrollment data record.

20 Claims, 6 Drawing Sheets

U.S. PATENT DOCUMENTS

| | | |
|---|---|---|
| 2009/0037978 A1 | 2/2009 | Luque et al. .................... 726/2 |
| 2009/0080778 A1 | 3/2009 | Lee et al. ..................... 382/195 |
| 2009/0271634 A1 | 10/2009 | Boult et al. ................. 713/186 |
| 2009/0289760 A1 | 11/2009 | Murakami et al. ......... 340/5.82 |
| 2010/0030695 A1 | 2/2010 | Chen et al. .................... 705/67 |
| 2010/0039223 A1 | 2/2010 | Siedlarz ..................... 340/5.82 |
| 2010/0045787 A1 | 2/2010 | Uno ............................. 348/77 |
| 2010/0088233 A1 | 4/2010 | Tattan et al. .................. 705/50 |

OTHER PUBLICATIONS

An adaptive multi-biometric incremental fusion strategy in the context of BMEC 2007, Alano et al., Control, Automation, Robotics and Vision, Dec. 2008, pp. 1144-1149.

"Adaptive feature set updating algorithm for multimodal biometrics", Kekre et al, ACM Special Interest Group on Artificial Intelligence, 2009, pp. 277-282.

"Two-stage fingerprint classification system", Cappelli et al., ACM SIGMM workshop on Biometrics methods and applications, Nov. 2003, pp. 95-99.

FIG. 4

METHOD AND SYSTEM FOR CONDUCTING IDENTITY MATCHING

CROSS-REFERENCE TO RELATED APPLICATIONS

This is a continuation application of U.S. patent application Ser. No. 12/714,568, filed Mar. 1, 2010.

BACKGROUND OF THE INVENTION

This invention relates generally to methods and systems for conducting identity matching, and more particularly, to methods and systems for conducting efficient multi-modal biometric large scale 1:N identity matching.

Biometric fusion combines a plurality of biometric samples, of the same or different biometric modality, to yield higher accuracy and lower false accept rates during matching in large scale 1:N biometric matching systems. Known biometric fusion techniques include parallel fusion and cascade fusion. Parallel fusion techniques generally involve score-level fusion of individual biometric scores into a single composite score. However, known parallel fusion techniques always require biometric data for each modality to be matched.

Cascade fusion techniques generally execute a series of algorithms such that a subsequent algorithm is executed against candidate matches determined by a previous algorithm. However, cascade fusion assumes that every candidate always includes all the biometric modalities. When considering large populations, all members of the population rarely are able to provide all biometric modalities required by either parallel or cascade fusion techniques. For example, amputees may not be able to provide finger biometric data samples. Furthermore, when using data from legacy systems to conduct large scale 1:N identity matching, the legacy data may not include all the biometric data required by parallel and cascade fusion systems.

Known biometric matching systems fail to separate management of the overall population from the provisioning of the matching systems. Thus, using known biometric matching systems, it is difficult, time consuming and expensive to apply certain matching algorithms to data from specific groups of individuals within the overall population. Consequently, it appears that separating management of the overall population from the provisioning of the matching systems may facilitate easier application of certain matching algorithms against data from specific groups of individuals, and may thereby reduce associated time and costs.

BRIEF DESCRIPTION OF THE INVENTION

In one aspect, a method of managing large scale biometric data identity matching when subsets of an overall population have different combinations of biometric data is provided. The method includes identifying a plurality of biometric modalities to be used in conducting identity matches, determining data quality levels for each of the biometric modalities, defining a plurality of subpopulations, and generating a matrix including a grid. Moreover, the method includes defining a plurality of matrix entries with the grid, positioning designations for each of the subpopulations along a first side of the matrix and along a second side of the matrix, determining one of the plurality of biometric modalities to be a primary biometric modality and determining at least one matching algorithm, and determining whether the at least one matching algorithm is compatible with each matrix entry.

When the at least one matching algorithm is compatible with the matrix entry the method includes assigning a corresponding one of a plurality of matching systems configured to execute the at least one matching algorithm to the matrix entry, and assigning additional ones of the plurality of matching systems to the matrix entry. The additional matching systems are configured to conduct 1:1 or 1:few matching after the corresponding one of the matching systems conducts a 1:N identity matching.

Furthermore, the method includes obtaining biometric data, configuring the obtained biometric data as a probe, and determining characteristics of the probe such that a row in the matrix, to be used to define matching for an entire population, is determined. The method also includes determining a first matrix entry corresponding to the characteristics of the probe and to a first one of the subpopulations, determining at least one matching system corresponding to the first subpopulation, comparing the probe against enrollment data records stored in the corresponding at least one matching system to conduct the identity match, and storing information regarding a matching enrollment data record in a queue when the probe matches an enrollment data record, The method ends by communicating the queue to an entity performing the identity match.

In another aspect a system for managing large scale biometric identity matching when subsets of a population have different combinations of biometric data is provided. The system includes a computer configured as a server. The server includes at least a database that is configured to store within therein at least enrollment data records of a population. The server is also configured to determine a plurality of biometric modalities, to determine quality levels of the biometric modalities, to define a plurality of subpopulations, to determine a primary biometric modality and to generate a matrix.

Moreover, the system includes at least one client system configured to communicate with the server, and a plurality of matching systems. Each of the plurality of matching systems is configured to communicate with the server, to conduct 1:1 or 1:few matching after conducting 1:N identity matching, and to compare a probe against matching system enrollment data records stored therein.

The server is further configured to communicate with the at least one client system and the matching systems, to determine a first matrix entry included in the matrix corresponding to the characteristics of the probe and to a subpopulation, and to determine at least one of the matching systems corresponding to the subpopulation. Moreover, the server is configured to store information regarding a matching enrollment data record included in the matching system enrollment data records in a queue, when the probe matches a matching system enrollment data record.

BRIEF DESCRIPTION OF THE DRAWINGS

FIG. 4 is a diagram illustrating an exemplary matrix of gallery subpopulations plotted against probe characteristics;

DETAILED DESCRIPTION OF THE INVENTION

Figure 1:
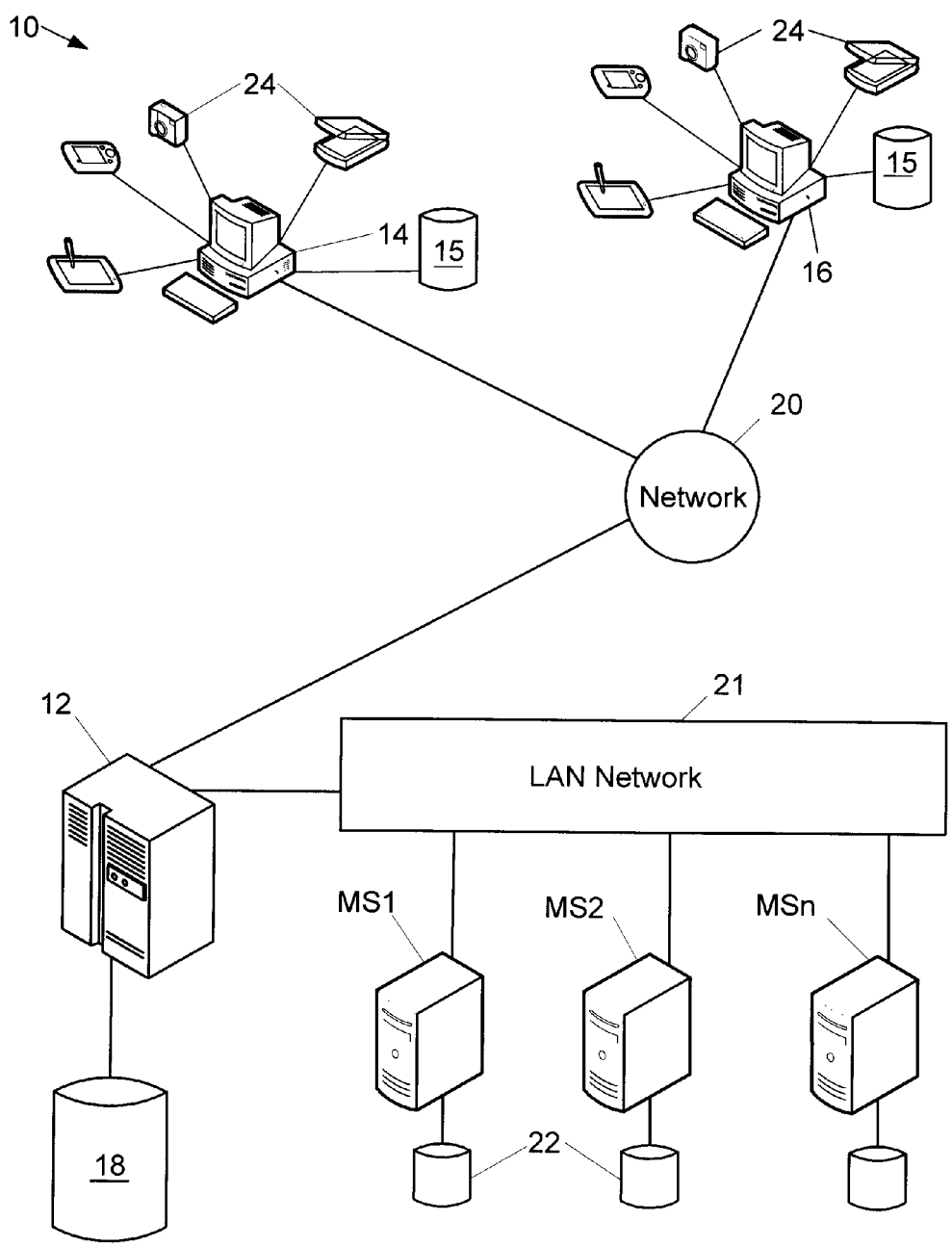
FIG. 1 is an expanded block diagram of an exemplary embodiment of a system architecture of a Sequential Fusion Computer (SFC) System.

FIG. 1 is an expanded block diagram of an exemplary embodiment of a system architecture of a Sequential Fusion Computer (SFC) System 10 for implementing large scale 1:N identity matching that accounts for individuals who are not associated with all the modalities of biometric data used by the SFC system 10. More specifically, the SFC system 10 includes a Global Population Manager and Match Coordinator (GPMMC) System 12, a plurality of biometric matching systems MSn, at least one front end enrollment client system 14, and (optionally) one back end client system 16. It should be understood that as described herein a 1:N identity match refers to identification of an individual by comparing the identifying information of the individual against identifying information of a plurality of other individuals. In the exemplary embodiment, biometric data is the identifying information.

In the exemplary embodiment, the GPMMC system 12 includes components such as, but not limited to, a web server, a database server, an application server, a match coordination server, a directory server and a disk storage unit 18. The disk storage unit 18 may be used to store any kind of data. The match coordination server is configured to manage matching of any biometric modality or information associated with individuals enrolled in the GPMMC system 12 such that large scale 1:N identity matching may be conducted as described herein. Although these components are combined to form a single structure in the form of the GPMMC system 12 in the exemplary embodiment, it should be appreciated that in other embodiments these components may be separately positioned at different locations and operatively coupled together in a network such as, but not limited to, a local area network (LAN), a wide area network (WAN), or the Internet. The GPMMC system 12 is typically configured to be communicatively coupled to end users at the client systems 14, 16 using a communications network 20 such as, but not limited to, a LAN, a WAN, or the Internet. Moreover, the network 20 may include any combination of a LAN, a WAN and the Internet. The GPMMC system 12 is also configured to be communicatively coupled to the biometric matching systems over the LAN 21. It should be understood that any authorized end user at the client systems 14, 16 may access the GPMMC system 12. In the exemplary embodiment, the GPMMC system 12 is a computer system that manages the overall process of large scale 1:N identity matching. The clients systems 14, 16, the GPMMC system 12, and the matching systems MSn may be associated with any entity involved with conducting identity matching including, but are not limited to, motor vehicle administrations, national identity registrars, pension system administration agencies, welfare system administration agencies, financial institutions and medical service providers. Thus, it should be appreciated that the GPMMC system 12 may be any computer system associated with any entity that performs large-scale 1:N matching.

It should be understood that the GPMMC system 12 is configured to store therein biometric data of a population to be processed. That is, the GPMMC system 12 is configured to store and manage biometric data of the entire population being processed, such that large scale 1:N identity matching for the entire population stored therein may be conducted. The GPMMC system 12 is configured to at least determine at least one of the matching systems MSn that is to be used for conducting 1:N identity matching and 1:1 identity verification, determine data quality levels, define subpopulations within a population, generate a matrix, and determine a plurality of biometric modalities. Using biometrics as the basis for identification facilitates enhancing trust in the 1:N identity matching. In order to facilitate properly conducting large scale 1:N identity matching, the GPMMC system 12 stores raw biometric data in the form of GPMMC enrollment data records. It should be understood that raw biometric data includes an image corresponding to a captured biometric modality such as, but not limited to, fingerprints and face. The raw data is processed to generate a matching template which is stored and used by the matching systems MSn. In the exemplary embodiment, the GPMMC enrollment data records include at least raw biometric data obtained from each individual enrolled therein. It should be appreciated that in other embodiments the GPMMC enrollment data records may also include matching templates for each individual derived from the obtained raw biometric data.

In the exemplary embodiment, each of the matching systems MSn includes components such as, but not limited to, a web server, a disk storage device 22, a database management server, an application server, and a matching server. Although these components are combined into a single structure in the exemplary embodiment, it should be appreciated that in other embodiments these components may be separately positioned at different locations and operatively coupled together in a network such as, but not limited to, a LAN, a WAN, or the Internet. The disk storage device 22 may be used for storing at least matching templates derived from raw biometric data captured from individuals enrolled in the GPMMC system 12, and the database management system may be used to facilitate transferring data to and from the disk storage device 22. Each match server is configured to perform matching using a specific biometric modality to conduct a large scale 1:N identity match of enrollees as described herein. However, it should be appreciated that in other embodiments each match server may also be configured to conduct identity matching with any information associated with an enrollee such as, but not limited to, biographic data, and to verify the claimed identity of an individual by performing a 1:1 search. It should be appreciated that the designation "n" as used in conjunction with the matching systems MSn, is intended to indicate that any number "n" of matching systems may be used that facilitates conducting large scale 1:N identity matching of enrollees as described herein.

In the exemplary embodiment, in contrast to the GPMMC system 12, each of the matching systems MSn is configured to store therein biometric data of a portion of an entire population. That is, each matching system MSn is configured to store and manage a portion of the entire population enrolled in the GPMMC system 12, and to conduct large scale 1:N identity matching for only that portion of the entire population stored therein. Similar to the GPMMC system 12, each of the matching systems MSn is configured to store biometric data in the form of matching system enrollment data records. The matching system enrollment data records include at least matching templates derived from raw biometric data obtained from each individual enrolled therein. In other embodiments the matching system enrollment data records may also include the raw biometric data obtained from each individual enrolled therein. It should be appreciated that, in general, each matching system MSn stores biometric data for different enrollees. However, due to practical design considerations such as total numbers of matching systems MSn and various ways individuals may attempt to circumvent duplicate detection, different matching systems MSn may also store biometric data for a number of the same enrollees.

It should be understood that each of the matching systems MSn is configured to store therein a respective matching application that causes the respective matching system MSn to execute a matching algorithm particular to the subpopulation stored therein. In the exemplary embodiment each subpopulation is defined primarily based on characteristics of the subpopulation's biometric data. The matching algorithm executed by each matching system MSn corresponds to the biometric data characteristics of a respective subpopulation. Thus, in the exemplary embodiment, each subpopulation is associated with at least one corresponding matching system MSn. Each of the matching systems MSn is configured to be communicatively coupled to the GPMMC system 12 over the LAN 21. It should be appreciated that the matching systems MSn are not configured to be communicatively coupled to the clients systems 14, 16. Likewise, the client systems 14, 16 are not configured to be communicatively coupled to the matching systems MSn.

In the exemplary embodiment, raw biometric data corresponding to any biometric modality may be collected and stored as GPMMC enrollment data records in the GPMMC system 12, and matching templates derived from the collected raw biometric data stored in the matching systems MSn. Such biometric modalities include, but are not limited to, finger, iris, face and voice. Moreover, the raw biometric data may take any form such as, but not limited to, images, photographs, and electronic data representations.

In order to perform large scale 1:N identity matching of individuals with the GPMMC system 12 and the matching systems MSn, the raw biometric data of a plurality of individuals should be collected and stored in the GPMMC system 12, and corresponding matching templates derived and stored in the matching systems MSn, prior to conducing large scale 1:N identity matches. Obtaining and storing such data prior to conducting identity matching operations is generally known as enrolling an individual. It should be appreciated that the GPMMC enrollment data records and the matching system enrollment data records, together constitute a gallery of enrollment data.

In the exemplary embodiment the client systems 14 are configured to include enrollment screens appropriate for collecting finger, face, and iris raw biometric data during enrollment, and are configured to include biometric capture devices 24 for capturing finger, face, and iris biometric data submitted by individuals. However, it should be appreciated that in other embodiments, the raw biometric data may be provided by any method other than enrollment stations and entered into the GPMMC system 12, and corresponding matching templates may be provided and entered into the matching systems MSn using any method that facilitates large scale 1:N identity matching as described herein. Such methods include, but are not limited to, automatically reading the desired raw biometric data or matching template from identity documents, and extracting the desired raw biometric data or desired matching template from legacy databases included in other client systems 16. Such other client systems 16 include, but are not limited to, client systems 16 associated with motor vehicle administrations, social security administrations, welfare system administrations, financial institutions and health care providers. Such identity documents include, but are not limited to, passports and driver's licenses. However, in other embodiments biographic data may also be collected from individuals and stored in the GPMMC system 12, and in the matching systems MSn. In such other embodiments, the biographic data is included in the GPMMC enrollment data records such that the biographic data is associated with the raw biometric data of the corresponding enrollee in the GPMMC system 12. Moreover, in such other embodiments, the biographic data is included in the matching system enrollment data records such that the biographic data is associated with the matching template of the corresponding enrollees in the matching systems MSn.

The term "biographic data" as used herein includes any demographic information regarding an individual as well as contact information pertinent to the individual. Such demographic information includes, but is not limited to, an individual's name, age, date of birth, address, citizenship and marital status. Moreover, biographic data may include contact information such as, but not limited to, telephone numbers and e-mail addresses. However, it should be appreciated that in other embodiments any desired data associated with the individual may be enrolled.

The front end enrollment client systems 14 and the back end client systems 16 each may include devices, such as, but not limited to, a CD-ROM drive for reading data from computer-readable recording mediums, such as a compact disc-read only memory (CD-ROM), a magneto-optical disc (MOD) and a digital versatile disc (DVD). Additionally, the computers included in each of the client systems 14, 16 may include a memory (not shown). Moreover, each of the client systems 14, 16 may include display devices, such as, but not limited to, liquid crystal displays (LCD), cathode ray tubes (CRT) and color monitors. Furthermore, each of the client systems 14, 16 may include printers and input devices such as, but not limited to, a mouse (not shown), keypad (not shown), a keyboard, a microphone (not shown). Additionally, the enrollment client systems 14 may include components such as, but not limited to, a web server, a database server, an application server, a directory server and a disk storage unit 15, and biometric capture devices 24. The disk storage unit 15 may be used to store any kind of data.

Each of the biometric capture devices 24 includes hardware configured to capture a specific type of biometric sample. In the exemplary embodiment, each biometric capture device 24 may be any device that captures any kind of desired biometric data sample that facilitates conducting large scale 1:N identity matching as described herein. Such devices include, but are not limited to, iris scanners, fingerprint scanners, vascular scanners, digital cameras, and microphones. It should be appreciated that although the exemplary embodiment includes one enrollment client system 14 and one back end client system 16, other embodiments may include any number of enrollment client systems 14 and any number of back end client systems 16.

The GPMMC system 12, each of the matching systems MSn, and each of the client systems 14, 16 includes a processor (not shown) and a memory (not shown). It should be understood that, as used herein, the term processor is not limited to just those integrated circuits referred to in the art as a processor, but broadly refers to a computer, an application specific integrated circuit, and any other programmable circuit. It should be understood that the processor executes instructions, or computer programs, stored in the memory (not shown). The above examples are exemplary only, and are thus not intended to limit in any way the definition and/or meaning of the term "processor."

The memory (not shown) in the GPMMC system 12, in each of the matching systems MSn and in the client systems 14, 16, can be implemented using any appropriate combination of alterable, volatile or non-volatile memory or non-alterable, or fixed, memory. The alterable memory, whether volatile or non-volatile, can be implemented using any one or more of static or dynamic RAM (Random Access Memory), a floppy disc and disc drive, a writeable or re-writeable optical disc and disc drive, a hard drive, flash memory or the like. Similarly, the non-alterable or fixed memory can be implemented using any one or more of ROM (Read-Only Memory), PROM (Programmable Read-Only Memory), EPROM (Erasable Programmable Read-Only Memory), EEPROM (Electrically Erasable Programmable Read-Only Memory), an optical ROM disc, such as a CD-ROM or DVD-ROM disc, and disc drive or the like.

It should be appreciated that the memory of GPMMC system 12, the memory of each of the matching systems MSn, and the memory included in the client systems 14, 16, is used to store executable instructions, or computer programs, therein. The term "computer program" is intended to encompass an executable program that exists permanently or temporarily on any computer-readable recordable medium that causes the computer or computer processor to execute the program.

Figure 2:
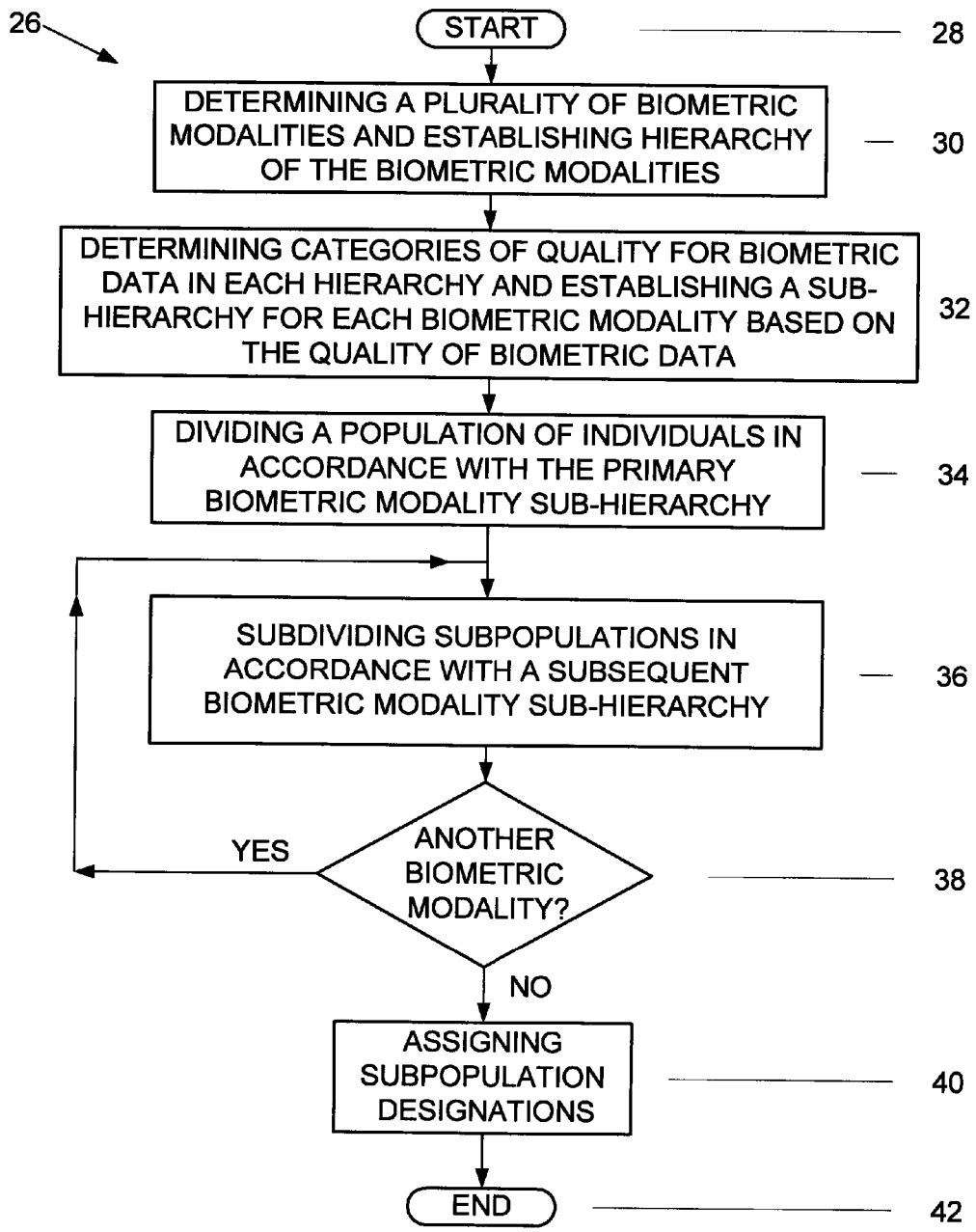
FIG. 2 is a flowchart illustrating an exemplary process for dividing a population of individuals into subpopulations.

FIG. 2 is a flowchart 26 illustrating an exemplary process for dividing a population of individuals into subpopulations. The process starts 28 by determining 30 a plurality of biometric modalities based on criteria such as, but not limited to, strong 1:N identity matching performance, low cost, reliability, and prevalence in legacy databases. Processing continues by establishing a hierarchy of the biometric modalities 30 by determining which of the biometric modalities best conforms to the criteria. In the exemplary embodiment, the biometric modalities are iris, face and finger. Finger biometric data is judged to best conform to the criteria because finger biometric data is associated with highly reliable and highly accurate 1:N identity matching results, and is prevalent amongst many legacy databases. Because finger biometric data best conforms to the criteria, finger biometric data is determined to be the primary biometric modality used for conducting large scale 1:N identity matching in the exemplary embodiment. Because iris biometric data is also associated with very strong large scale 1:N identity matching performance and favorable cost characteristics, iris biometric data is determined to be the secondary biometric modality. Face biometric data is currently associated with unacceptably poor 1:N identity matching performance and is currently associated with high false accept rates. Thus, it is determined that face biometric data poorly conform to the criteria. As a result, face biometric data is determined to be the tertiary biometric modality used for large scale 1:N identity matching in the exemplary embodiment.

It should be understood that the primary biometric modality is the preferred biometric modality for conducting 1:N identity matches. When adequate primary biometric modality data is not available secondary biometric modality data is used, and when adequate secondary biometric modality data is not available, tertiary biometric modality data is used to conduct large scale 1:N identity matching in the exemplary embodiment. Consequently, in the exemplary embodiment a hierarchy of biometric modalities is established that includes a primary biometric modality, a secondary biometric modality, and a tertiary biometric modality. It should be understood that the use of a primary, secondary or tertiary biometric does not preclude the additional use of other biometrics to assist in refining the matches for each sub-population.

After establishing the hierarchy of biometric modalities 30, processing continues by determining categories of quality for biometric data to be used to further divide subpopulations of data 32. In the exemplary embodiment, biometric data is categorized as one of high quality data, low quality data and unavailable data. High quality data indicates that biometric data satisfies a required quality threshold, and low quality data indicates that biometric data has been collected, but does not satisfy the required quality threshold. It should be appreciated that individuals associated with high quality data are considered to be fully enrolled with respect to the respective biometric modality, and that individuals associated with low quality biometric data are not successfully enrolled with respect to the respective biometric modality. Unavailable data indicates that particular biometric data for an individual simply was not successfully collected from the individual during enrollment. It should be understood that as used herein, enrollment includes extracting desired raw biometric data or matching templates from at least one legacy database and storing the extracted raw biometric data or extracted matching templates in the GPMMC system 12 or in at least a respective one of the matching systems MSn, respectively. Thus, individuals may be enrolled in the GPMMC system 12 and in the matching systems MSn electronically without having to again collect raw biometric data from the individual. The particular biometric data may not have been obtained because associated fingers were amputated, or the enrollment data records for an individual were obtained electronically from a different biometric system and the particular biometric data was not included in the enrollment data record because the particular biometric was not obtained during enrollment in that legacy system.

Next, processing continues by establishing a sub-hierarchy 32 for each biometric modality included in the hierarchy of biometric modalities. In the exemplary embodiment, each sub-hierarchy is determined based on the quality of biometric data to be included in the hierarchy. Thus, the primary biometric modality is subdivided into a category for individuals associated with high quality finger biometric data, a category for individuals associated with low quality finger biometric data, and a category for individuals from whom finger biometric data has not been obtained and who thus are not associated with finger biometric data. Likewise, the secondary biometric modality is subdivided into a category for individuals associated with high quality iris biometric data, a category for individuals associated with low quality iris biometric data, and a category for individuals from whom iris biometric data has not been obtained and who thus are not associated with iris biometric data. The tertiary biometric modality is subdivided into categories for individuals associated with high and low face biometric data. The tertiary biometric modality is not subdivided into a category for unavailable face biometric data in the exemplary embodiment. It should be understood that the high quality biometric data category for each of the primary and secondary modalities is preferred for conducting large scale 1:N identity matching in the exemplary embodiment. When high quality biometric data is not available, low quality biometric data may be used, but may be processed differently than high quality data. Consequently, a sub-hierarchy of each biometric modality based on biometric data quality is established that includes high quality biometric modality data, low quality biometric modality data and unavailable data.

Although the exemplary embodiment uses biometric modalities of finger, iris and face, it should be appreciated that in other embodiments any other biometric modality may be used that conforms to the criteria described herein. Such other biometric modalities include, but are not limited to, voice. Moreover, although three biometric modalities are described in the exemplary embodiment, it should be appreciated that in other embodiments any number of biometric modalities may be used that facilitates subdividing populations as described herein. Although the exemplary embodiment defines the primary, secondary and tertiary biometric modalities as finger, iris, and face, it should be appreciated that in other embodiments the primary, secondary and tertiary biometric modalities may be defined using any combination of biometric data. For example, in such other embodiments, the primary, secondary and tertiary biometric modalities may be defined as iris, face and voice, respectively.

Next, processing continues by dividing a population of individuals, enrolled in the GPMMC system 12, into subpopulations in accordance with the primary biometric modality sub-hierarchy 34. Specifically, each individual enrolled in the GPMMC system 12 is associated with a respective one of the high quality finger biometric data category, the low quality finger biometric data category, and the unavailable data category. By virtue of associating each of the individuals with a respective category included in the sub-hierarchy, the entire population of individuals enrolled in the GPMMC system 12 is subdivided into three different subpopulations. A first subpopulation includes individuals associated with high quality finger biometric data, a second subpopulation includes individuals associated with low quality finger biometric data, and a third subpopulation includes individuals who are not associated with finger biometric data.

Processing continues by further subdividing each of the first, second and third subpopulations in accordance with a subsequent biometric modality sub-hierarchy 36. In the exemplary embodiment the subsequent biometric modality is the second biometric modality. Thus, each individual included in the first, second and third subpopulations is associated with a respective one of the high quality iris biometric data category, the low quality iris biometric data category, and the unavailable iris data category. By virtue of associating each of the individuals with a respective category included in the sub-hierarchy of the secondary biometric modality, each of the first, second and third subpopulations is further divided into three different subpopulations such that the total population enrolled in the GPMMC system 12 is divided in to nine different subpopulations.

After subdividing the first, second and third subpopulations 36, processing continues by determining whether another biometric modality is to be used for further subdividing the nine different subpopulations 38. When another biometric modality is not to be used for subdividing the nine different subpopulations 38, processing continues by assigning subpopulation designations to each of the nine different subpopulations 40. Otherwise, processing continues by further subdividing each of the nine different subpopulations in accordance with a different subsequent biometric modality sub-hierarchy 36. The different subsequent biometric modality is the tertiary biometric modality. Thus, each individual included in the nine different subpopulations is associated with a respective one of the high quality face biometric data category and the low quality face biometric data category. By virtue of associating each of the individuals with a respective category included in the sub-hierarchy of the tertiary biometric modality, each of the nine different subpopulations is further divided into two different subpopulations such that the total populations enrolled in the GPMMC system 12 is divided into eighteen different subpopulations. Next, processing continues by determining that another biometric modality is not to be used for subdividing the eighteen subpopulations 38, and assigning subpopulation designations 40 to each of the eighteen subpopulations. In the exemplary embodiment, alphabetic characters are used to designate each subpopulation. However, in other embodiments any method for designating the subpopulations may be used including, but not limited to, designating the subpopulations with alphanumeric characters. Next, processing ends 42.

Figure 3:
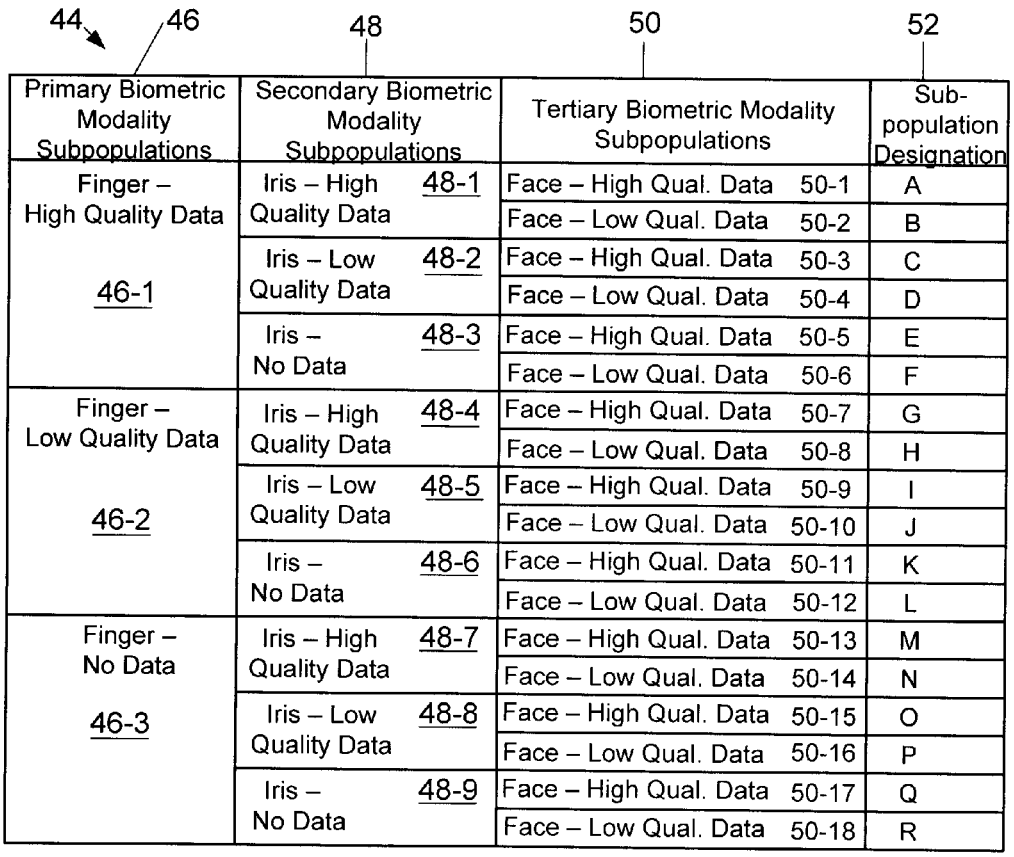
FIG. 3 is a diagram illustrating a graphical representation of the exemplary process for dividing a population of individuals into subpopulations as illustrated in FIG. 2.

FIG. 3 is a diagram 44 illustrating a graphical representation of the subpopulations determined using the subdividing process 26 described herein and as illustrated in FIG. 2. Specifically, the diagram 44 includes a column for each of the hierarchy of biometric modalities. Thus, the diagram 44 includes a column for the primary biometric modality 46, a column for the secondary biometric modality 48, and a column for the tertiary biometric modality 50. It should be appreciated that the diagram 44 includes another column for subpopulation designations 52. The first, second and third subpopulations determined according to the subdividing process 26 are represented as high quality finger data 46-1, low quality finger data 46-2, and no finger data 46-3, respectively. Moreover, the nine subpopulations determined according to the subdividing process 26 are represented as high quality iris data 48-1, 48-2, 48-3, low quality iris data 48-2, 48-5, 48-8, and no iris data 48-3, 48-6, 48-8. It should be understood that each of the high quality iris data subpopulations 48-1, 48-4, 48-7 are different, each of the low quality iris data subpopulations 48-2, 48-5, 48-8 is different, and each of the no iris data subpopulations is different. Furthermore, the eighteen subpopulations determined according to the subdividing process 26 are represented as high quality face data 50-1, 50-3, 50-5, 50-7, 50-9, 50-11, 50-13, 50-15, 50-17, and low quality face data 50-2, 50-4, 50-6, 50-8, 50-10, 50-12, 50-14, 50-16, 50-18. It should be understood that each of the high quality face data populations 50-1 to 50-17 is different, and that each of the low quality face data populations 50-2 to 50-18 is different. The subpopulations designation column 52 includes subpopulation designations A-R that each correspond to one of the face data populations 50-1 to 50-18.

The high quality finger data population 46-1 is associated with the iris populations 48-1, 48-2, 48-3; low quality finger data population 46-2 is associated with iris subpopulations 48-4, 48-5, 48-6; and, the no finger data subpopulation 46-3 is associated with iris subpopulations 48-7, 48-8, 48-9. Moreover, the iris subpopulations 48-1 to 48-9 are associated with a corresponding different one of the high quality face subpopulations and a corresponding different one of the low quality face subpopulations.

It should be understood that the diagram 44 is also a graphical representation of the subdividing process 26. For example, reading the diagram 44 from the primary biometric modality column 46 to the subpopulation designation column 52, individuals included in the subpopulation 46-1 may also be included in the high quality iris biometric data subpopulation 48-1. Moreover, individuals included in the high quality iris biometric data subpopulation 48-1 may also be included in the high quality face biometric data subpopulation 50-1, which corresponds to subpopulation "A." As a result, it should be understood that enrollees having high quality finger 46-1, iris 48-1, and face 50-1 biometric data are subdivided from the entire population by virtue of being included in the subpopulation "A." It should be understood that enrollees having high quality finger and iris biometric data, but low quality face biometric data, are subdivided from the rest of the population by virtue of being included in subpopulation "B."

As another example, reading diagram 44 from the primary biometric modality column 46 to the subpopulation designation column 52, individuals included in the low quality finger biometric data subpopulation 46-2 may have high quality iris 48-4 biometric data. Thus, these individuals are also included in the high quality iris biometric data subpopulation 48-4 associated with the low quality finger biometric data subpopulation 46-2. Furthermore, individuals included in the subpopulation 48-4 may have high quality face biometric data. Thus, these individuals are also included in the high quality face biometric data subpopulation 50-7, which corresponds to subpopulation designation "G." As a result, it should be understood that enrollees having low quality finger biometric data 46-2, high quality iris biometric data 48-4, and high quality face biometric data 50-7 are subdivided from the entire population by virtue of being included in the subpopulation "G." It should be understood that individuals having low quality finger biometric data 46-2, high quality iris biometric 48-1 and low quality face biometric data 50-8 are subdivided from the rest of the population by virtue of being included in subpopulation "H."

As yet another example, reading diagram 44 from the primary biometric modality column 46 to the subpopulation designation column 52, individuals included in the subpopulation 46-3 without finger biometric data may also have high quality iris biometric data 48-7. Thus, these individuals are also included in the high quality iris biometric data subpopulation 48-7. Moreover, individuals included in the subpopulation 48-7 may also have high quality face biometric data 50-13. Thus, these individuals are also included in the high quality face biometric data subpopulation 50-13, which corresponds to subpopulation designation "M." As a result, it should be understood that individuals without finger biometric data 46-3, but having high quality iris 48-7 and face biometric data 50-13 are subdivided from the entire population by virtue of being included in subpopulation "M." It should be understood that individuals without finger biometric data 46-3, having high quality biometric data 48-7 and low quality face biometric data 50-14 are subdivided from the rest of the population by virtue of being included in subpopulation "N."

It should be understood that in the exemplary embodiment, as part of large scale 1:N identity matching, biometric data of a new enrollee is compared against the enrollment data records of all previously enrolled individuals. However, it should be appreciated that in other embodiments large scale 1:N identity matching may be conducted with individuals other than new enrollees. The biometric data of an enrollee that is used in a comparison is also known as a probe. Thus, it should be appreciated that the biometric characteristics of the probe may be converted into one of the subpopulation designations A-R such that an appropriate matching technique may be determined.

Figure 4:
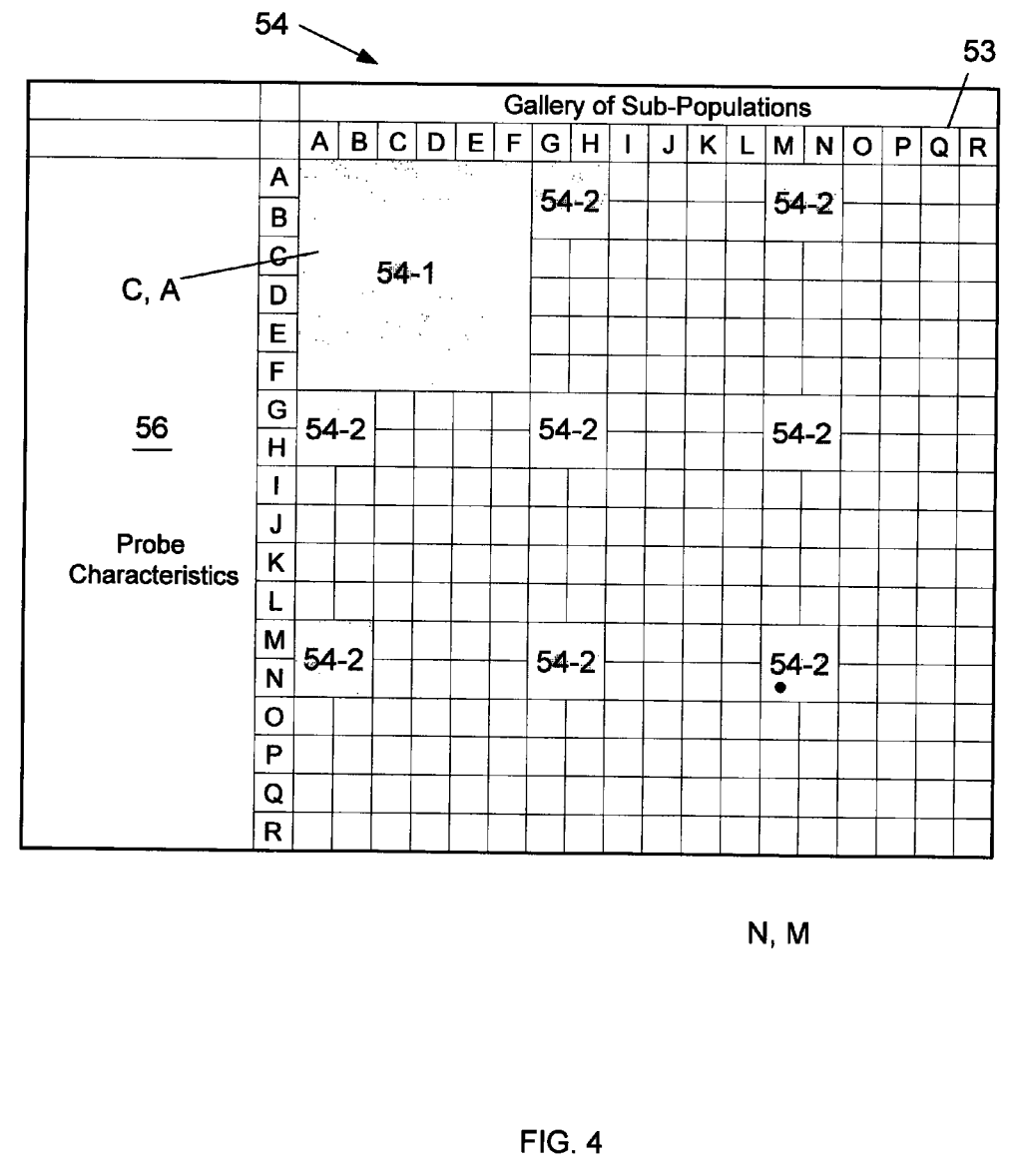

FIG. 4 is a diagram illustrating an exemplary matching matrix 54 of gallery subpopulations 53 plotted against probe characteristics 56. Specifically, gallery subpopulation designations 53, corresponding to the subpopulation designations A-R, are sequentially positioned along a first side of the matching matrix 54 such that the subpopulation designations A-R are listed along the first side. The subpopulation designations A-R are also sequentially positioned along a second side of the matching matrix 54 such that the subpopulation characteristics of a probe are listed sequentially along the second side. It should be appreciated that the second side of the matching matrix 54 is substantially orthogonal to the first side.

It should be understood that the subpopulation designations A-R listed sequentially along the first side of the matching matrix 54 together represent the entire population. Thus, the subpopulation descriptions A-R listed along the first side constitute a gallery of the subpopulations 53. Furthermore, it should be understood that the subpopulation designations A-R listed sequentially along the second side of the matching matrix 54 together represent all of the possible subpopulation characteristics of the probe of an individual new enrollee. Thus, the subpopulation designations A-R listed along the second side of the matching matrix 54 also represent all of the potential combinations of biometric characteristics for the probe.

It should be appreciated that matching matrix 54 includes a plurality of cells, or matrix entries, defined by row and column designations. A probe having characteristics of the subpopulation C may be compared against the subpopulation A. Plotting the row of matrix 54 corresponding to a probe having characteristics of the subpopulation C, against the column of matrix 54 corresponding to subpopulation A yields an intersecting cell, or matrix entry, having an address of C, A. It should be appreciated that in the exemplary embodiment each matrix entry compatible with the primary biometric modality is associated with the primary biometric modality and a corresponding matching system MSn that includes an algorithm for conducting 1:N identity matching based on the primary biometric modality. Each matrix entry that is compatible with the secondary biometric modality, and that is not already assigned to the primary biometric modality, is associated with the secondary biometric modality and a corresponding matching system MSn that includes an algorithm for conducting 1:N identity matching based on the secondary biometric modality. It should be understood that in the exemplary embodiment only matrix entries associated with high quality finger biometric data or high quality iris biometric data are associated with matching systems MSn that are configured to conduct 1:N identity matching based on the corresponding biometric modality. Such matrix entries are indicated in the shaded regions 54-1 and 54-2 of the matrix 54. Moreover, it should be appreciated that matrix entries compatible with either the primary or secondary biometric modality may also be associated with at least one additional biometric modality and at least one additional matching system MSn that includes an algorithm, corresponding to the at least one additional biometric modality, for conducting a 1:1 verification.

Matrix entries not compatible with the primary and secondary biometric modalities are associated with any available biometric data and with at least one of the matching systems MSn that includes an algorithm, corresponding to available biometric modality data, for conducting unimodal or parallel fusion, as supported by the available data. Because each matrix entry is associated with biometric modality data and at least one corresponding matching system MSn, by virtue of plotting an appropriate probe characteristic against each subpopulation included in the gallery of subpopulations 53, an appropriate biometric modality for conducting identity matching may be determined, as well as the respective matching system MSn for the identity matching.

For example, plotting a probe with the characteristics of subpopulation "B" against subpopulation N yields a matrix entry address of B, N. Matrix entry B, N indicates that iris biometric data is to be used for conducting the 1:N identity match and that an appropriate respective matching system MSn is to be used for conducting the 1:N identity match. Iris matching is associated with the matrix entry B, N because subpopulation N does not include high quality finger biometric data. It should be appreciated that probe characteristic "B" and the subpopulation N include the secondary biometric.

When 1:N identity matching is conducted, the 1:N identity matching may identify one or more candidate matches. In the exemplary embodiment, the candidates are further refined by applying the additional biometric modality and conducting a 1:1 verification with the at least one additional matching system MSn. Because the number of candidates generated during the 1:N identity matching is very small compared to the size of the sub-population, it is possible to apply the at least one additional biometric modality using 1:1 or 1:few matching. By setting the 1:N identity matching biometric matching threshold "lower" it is possible to increase the accuracy of the first biometric used, while accepting the generation of additional candidate matches. By lowering the initial threshold to increase accuracy, then sequentially applying the at least one additional biometric to eliminate candidate matches that are not true matches, the benefits of parallel fusion are realized at far lower costs in terms of algorithm and hardware costs.

It should be appreciated that the shaded area 54-1 designates an area within the matching matrix 54 that indicates where high quality finger biometric data is used to conduct 1:N identity matching. Shaded areas 54-2 designate areas where high quality iris biometric data are used to conduct the 1:N identity match. All other areas within the matching matrix 54 represent cases where a highly reliable 1:N biometric does not exist to execute a 1:N identity match. When a highly reliable biometric does not exist, to obtain high 1:N matching accuracy, parallel fusion is used. Because these residual subpopulations are small compared to the subpopulations represented by boxes 54-1 and 54-2 in the matrix, parallel fusion matching techniques provide reliable and accurate identity matching results at a low cost. Thus, it should be understood that each row in the matching matrix 54, corresponding to a probe characteristic 56, describes how a given probe can best be matched against all the subpopulations A-R to yield a highest quality 1:N identity matching result with the lowest resource consumption.

Figure 5:
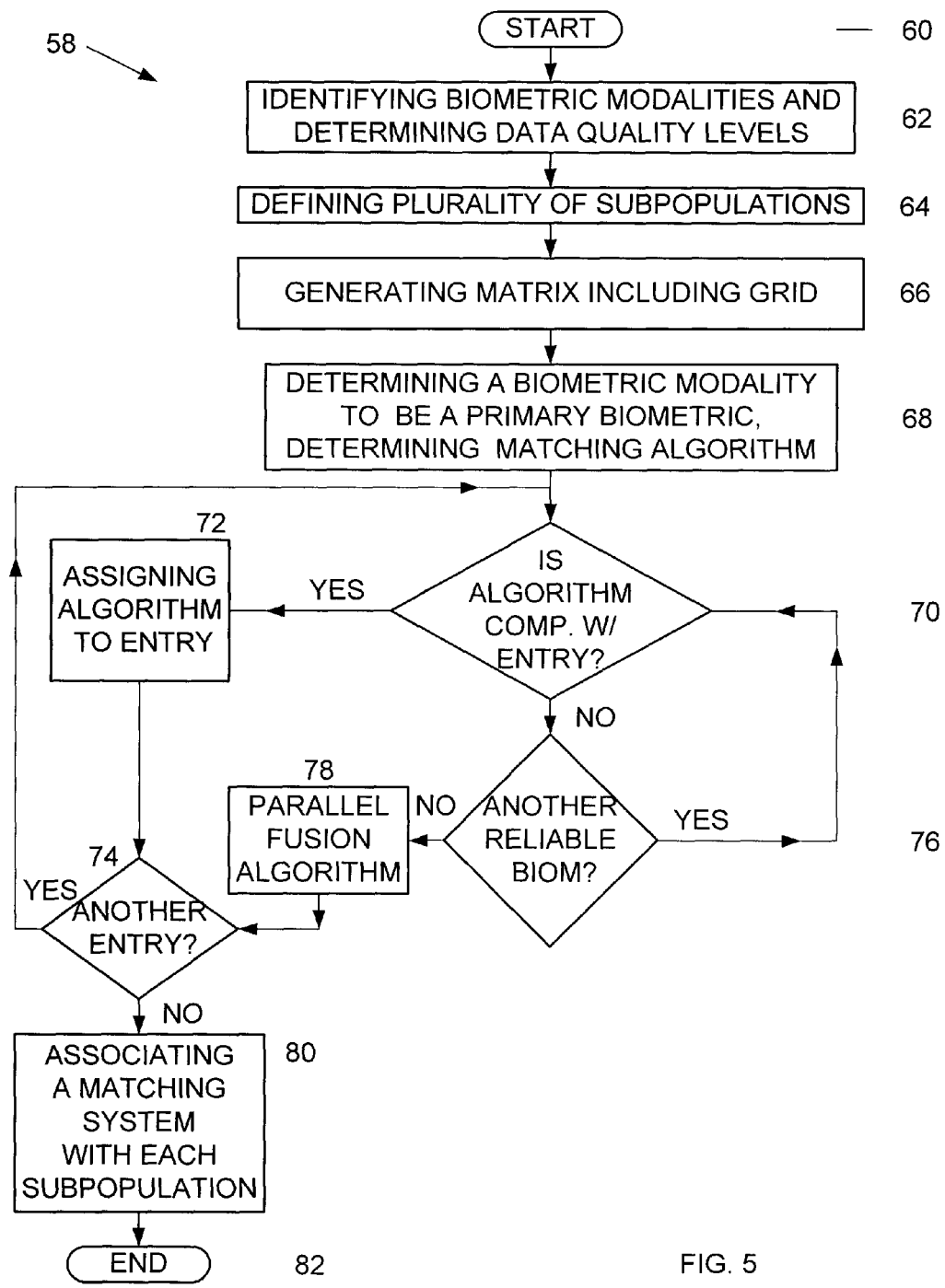
FIG. 5 is a flowchart illustrating an exemplary process for generating the exemplary matrix illustrated in FIG. 4.

FIG. 5 is a flowchart 58 illustrating an exemplary process for generating the matching matrix 54 illustrated in FIG. 4. The process starts 60 by identifying a plurality of biometric modalities 62 to be used in conducting the 1:N identity matches and determining 62 data quality levels in accordance with the process 26 as described herein and as illustrated in FIG. 2. In the exemplary embodiment, the biometric modalities used for conducting the identity matches are finger and iris. It should be appreciated that for some biometric modalities, such as face, a "no data" quality level may not be included.

Processing continues by defining 64 a plurality of subpopulations A-R in accordance with the process 26 described herein and as illustrated in FIG. 2. After defining 64 the plurality of subpopulations A-R, the process continues by generating 66 a matrix including a grid that defines a plurality of matrix entries, positioning 66 the subpopulation designations A-R along a first side of the grid, and positioning 66 the subpopulation designations A-R along a second side of the grid. It should be understood that each subpopulation designation A-R positioned along the first side labels a column of the matching matrix 54 and that each subpopulation designation positioned along the second side labels a row of the matching matrix 54.

The process continues by determining 68, in accordance with the process 26 as described herein and as illustrated in FIG. 2, one of the plurality of biometric modalities that is to be the primary biometric modality used for conducting the 1:N identity matching, and determining 68 a primary biometric matching algorithm, based on the primary biometric modality, for conducting identity matching. Moreover, a secondary matching algorithm is determined that corresponds to the second biometric modality. It should be understood that in the exemplary embodiment the primary and secondary biometric modalities provide highly reliable 1:N identity matching results, at low cost and are associated with few false candidate identity matching results. These highly reliable biometrics cover the vast majority of the entire population—that is, an extremely high percentage of the overall population has high quality data for finger, or iris, or both. For these individuals, sequential fusion works very efficiently, and only the small percentage of persons with neither high quality finger nor iris data require the use of parallel fusion techniques to maintain high accuracy.

Next, the process continues by determining 70 whether the primary biometric matching algorithm is compatible with each matrix entry. When a matrix entry corresponds to the required quality of the primary biometric modality, the matrix entry is compatible with the primary biometric matching algorithm. Processing continues by assigning 72 the matching algorithm to the matrix entry and associating the matrix entry with at least one additional biometric modality and at least one additional matching system MSn that includes an algorithm, corresponding to the at least one additional biometric modality, for conducting a 1:1 verification. Next, processing continues by determining 74 whether there is another matrix entry that has not been evaluated for compatibility. When another matrix entry is available for evaluation of compatibility processing continues by determining 70 whether the matching algorithm is compatible with the other matrix entry.

When the primary biometric matching algorithm is incompatible with the other matrix entry, processing continues by determining 76 whether the matching algorithm of another reliable biometric modality that has not been evaluated for compatibility with the other matrix entry is available. Specifically, the method continues by determining 76 whether the secondary matching algorithm has been evaluated for compatibility with the other matrix entry. When the secondary algorithm has not been evaluated for compatibility with the other matrix entry, the method continues by determining 70 whether the secondary algorithm is compatible with the other matrix entry. When the secondary algorithm is incompatible with the other matrix entry, processing continues by determining 76 whether the matching algorithm of another reliable biometric modality that has not been evaluated for compatibility with the other matrix entry is available. In the exemplary embodiment, when the primary and secondary matching algorithms have been evaluated, and because another reliable biometric modality and corresponding matching algorithm are not available, processing continues by assigning 78 a parallel fusion algorithm to the other matrix entry. It should be appreciated that parallel fusion economically compensates for the lack of high quality data because it is applied to very small subsets of the entire population.

Next, the method continues by determining 74 whether another matrix entry is available that has not been evaluated for compatibility. When another matrix entry is not available the method continues by associating 80 one of the matching systems MSn to each matrix entry. It should be understood that each matrix entry is associated with at least one of the matching systems MSn that is configured to execute the matching algorithm assigned to the matrix entry. Next, processing ends 82.

Figure 6:
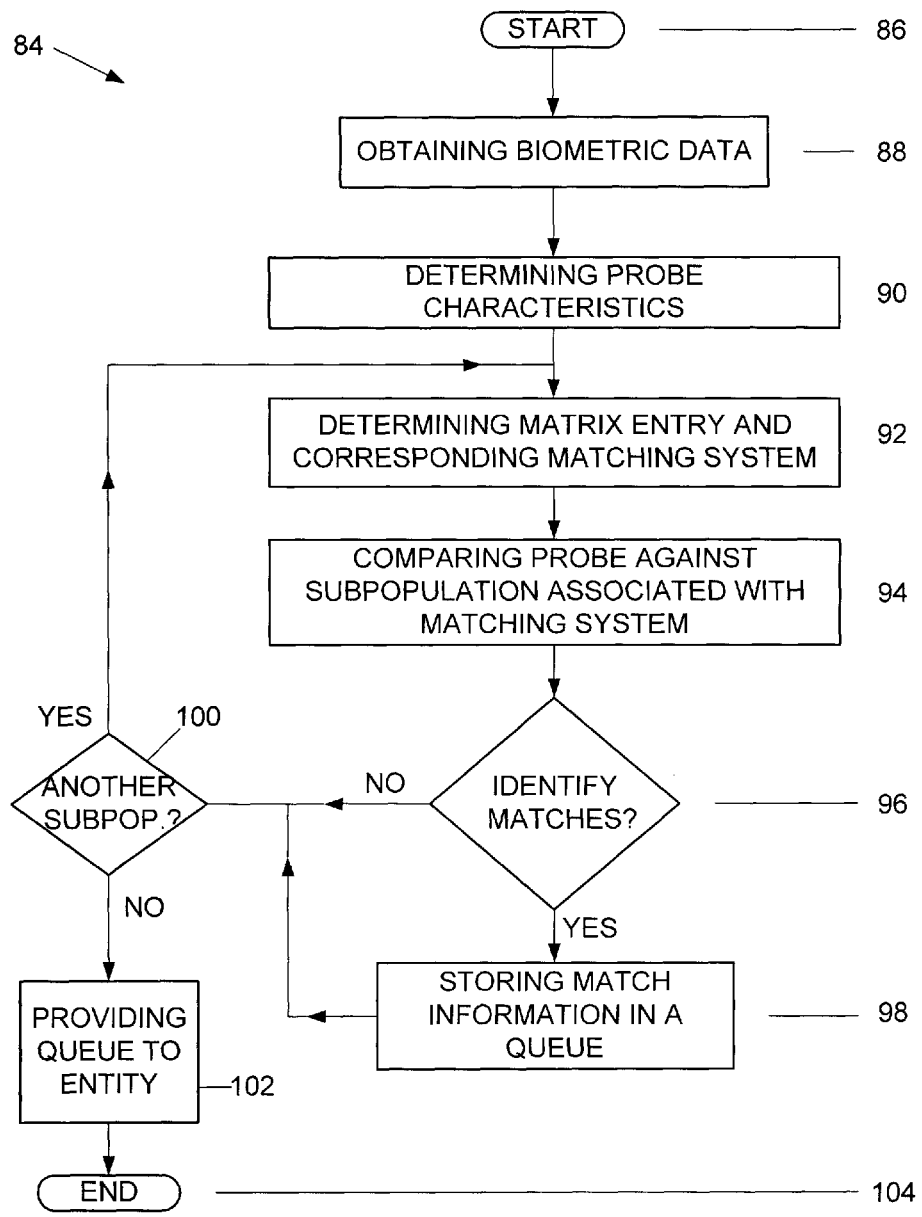
FIG. 6 is a flowchart illustrating an exemplary process for executing efficient 1:N identity matching in a large population system.

FIG. 6 is a flowchart 84 illustrating an exemplary process for managing subpopulations included in a gallery of biometric data subpopulations to account for enrollees that are unable to provide desired biometric data samples. The process starts 86 by obtaining 88 the primary, secondary and tertiary biometric data from an enrollee and including the obtained biometric data in a probe. In the exemplary embodiment, the primary, secondary, and tertiary biometrics are finger, iris and face biometric data, respectively. Processing continues by determining the characteristics of the probe 90 by evaluating the quality of the obtained primary, secondary and tertiary biometric data. The characteristics of the probe are compared against the characteristics of each subpopulation A-R and the probe is associated with one of the subpopulations A-R having the same characteristics.

Next, processing continues by determining 92 a first matrix entry corresponding to the probe and to a first one of the subpopulations A-R, and determining 92 the matching system MSn associated with the first matrix entry. Depending on the biometric data available and the associated matching system MSn, the determined matching system MSn either conducts a 1:N identity matching by comparing 94 the probe against the matching system enrollment data records of the subpopulation stored therein, or conducts a 1:1 parallel fusion matching, and determining 96 whether any of the matching system enrollment data records stored therein match the probe. When the probe matches a matching system enrollment data record stored in the determined matching system during a 1:N identity match, processing continues by sequentially evaluating the matches using any secondary or tertiary biometrics assigned to the first matrix entry. Any candidates that are confirmed are stored in a queue 98. Processing continues by determining 100 whether the probe has been compared against all of the subpopulations A-R. Otherwise, when the probe does not match a matching system enrollment data record in the determined matching system 96, processing continues by determining 100 whether the probe has been compared against all of the subpopulations A-R. When the probe has not been compared 100 against all of the subpopulations A-R, processing continues by determining a matrix entry 92 for the next subpopulation A-R to be matched. Otherwise, when the probe has been compared 100 against all of the subpopulations A-R, processing continues by providing 102 the queue to the entity requiring the 1:N identity match. For example, the queue may be communicated to a motor vehicle administration, a financial institution, a health care provider, the Internal Revenue Service, or the social security administration. Next, processing ends 104.

Although a subsequent 1:1 verification process occurs in the exemplary embodiment after conducting a 1:N identity matching, it should be appreciated that in other embodiments a subsequent verification process need not be conducted.

Although the exemplary embodiment divides a population into subpopulations based on biometric data and manages the subpopulation data such that 1:N identity matching and 1:1 identity matching are conducted, it should be appreciated that in other embodiments any other type of data may be used. That is, any other type of data may be used to divide a population into subpopulations and be used to facilitate conducting 1:N identity matching and 1:1 identity verification. Such other types of data include, but are not limited to, biographic data and object data. For example, biographic data including a date of birth or a name supports matching that is highly accurate. As an example of object data, if a database of ships includes electronic characteristics of radio transmitters for each ship and sonar characteristics of the engines and hull of each ship, the database of ships may be used to compare recently obtained radio and sonar data to identify a ship.

In the exemplary embodiments, the above described methods of managing subpopulations of biometric data, facilitate quickly, accurately, and economically conducting 1:N identity matching by using highly reliable 1:N biometrics followed by 1:1 verification for short candidate lists for the bulk of an overall population. The remaining small portions of the population which cannot support a highly reliable 1:N biometric are processed using parallel fusion or other techniques. It should be appreciated that different subsets of the population have different combinations of biometric data, so these techniques may vary by sub-population. More specifically, a subpopulation matrix is generated and is used to facilitate associating a plurality of different matching systems with corresponding segments, or subpopulations, within an entire population. Each matching system includes a different matching algorithm that may be configured to conduct 1:N identity matching or 1:1 verification on the corresponding subpopulation, and the results from each 1:N identity match and 1:1 verification generated by the different matching systems are aggregated into a single consolidated response.

Consequently, results from large scale 1:N identity matching conducted for an entire population where different subsets of the population have different sets of biometric data are facilitated to be accurate, and the time and costs associated with such large scale 1:N identity matching is facilitated to be reduced. Accordingly, economic and efficient management of data is facilitated to be enhanced in a cost effective and reliable manner.

While the invention has been described in terms of various specific embodiments, those skilled in the art will recognize that the invention can be practiced with modification within the spirit and scope of the claims.

What is claimed is:

1. A method of conducting biometric identification matching comprising:
    dividing an entire population into subpopulations;
    generating a matrix including a plurality of matrix entries;
    associating each of the matrix entries with one of the subpopulations and with one of a plurality of matching systems that corresponds to the one subpopulation;
    obtaining biometric data, including the obtained biometric data in a probe, and determining a row in the matrix corresponding to characteristics of the probe;
    conducting a 1:N identity match between the probe and each subpopulation using the one matching system corresponding to each subpopulation;
    determining a candidate match when the probe matches a matching system enrollment data record in the corresponding one matching system;
    conducting a 1:1 verification to eliminate the candidate match if the candidate match is not a true match, the corresponding one matching system being associated with a reliable one of a plurality of biometric modalities;
    storing the candidate match in a queue when the candidate match is confirmed; and
    communicating the queue to an entity requiring the identity match.

2. A method in accordance with claim 1, said generating a matrix operation further comprising:
    determining whether each matrix entry is compatible with one of a plurality of biometric modality matching algorithms;
    associating each matrix entry with a compatible one of the biometric modality matching algorithms; and
    associating each matrix entry associated with a compatible one of the biometric modality algorithms with an additional biometric modality matching algorithm.

3. A method in accordance with claim 2, said associating each of the matrix entries with one of the plurality of matching systems operation comprising:
    associating each matrix entry associated with a compatible one of the biometric modality matching algorithms, when the compatible one of the biometric modality matching algorithms is based on a reliable biometric modality, with one of the matching systems that includes the compatible biometric modality algorithm for executing said conducting a 1:N identity match operation based on the reliable biometric modality; and associating each matrix entry that is incompatible with the biometric modality matching algorithms, when the biometric matching algorithms are based on the reliable biometric modality, with one of the matching systems that includes a parallel fusion algorithm for executing said conducting a 1:N identity match operation.

4. A method in accordance with claim 2, further comprising executing said conducting a 1:1 verification operation with the additional biometric modality matching algorithm.

5. A method in accordance with claim 1, said dividing an entire population operation comprising:
   determining the plurality of biometric modalities based on criteria;
   determining one of the plurality of biometric modalities that best conforms to the criteria as a primary biometric modality;
   determining another one of the plurality of biometric modalities as a secondary biometric modality based on conformance to the criteria; and
   determining a third one of the plurality of biometric modalities as a tertiary biometric modality based on conformance to the criteria.

6. A method in accordance with claim 5, said dividing an entire population operation further comprising:
   establishing a hierarchy of the biometric modalities; and
   establishing a sub-hierarchy for each biometric modality included in the hierarchy, each sub-hierarchy being based on the quality of biometric modality data to be included in the hierarchy and including at least high and low quality biometric modality data.

7. A system for conducting biometric identification matching comprising:
   a computer configured as a server, said server including at least a database, said server being operable to store within said database at least enrollment data records of an entire population, determine a plurality of biometric modalities, determine quality categories for each of the biometric modalities, and generate a matrix including a plurality of matrix entries, wherein each of the matrix entries is associated with one of a plurality of subpopulations;
   at least one client system configured to communicate with said server and being operable to at least obtain biometric data; and
   a plurality of matching systems, wherein each matching system
      corresponds to one of the subpopulations,
      is operable to store therein matching system enrollment data records of the corresponding subpopulation, and
      is configured to communicate with said server,
   said server being operable to
      communicate with said at least one client system and said matching systems,
      associate each of the matrix entries with one of said matching systems,
      include obtained biometric data in a probe,
      determine characteristics of the probe and a row in the matrix corresponding to the probe, and
   each matching system being operable to
      conduct a 1:N identity match by comparing the probe against the matching system enrollment data records stored therein,
      determine a candidate match when the probe matches one of the matching system enrollment data records stored therein, and
      conduct a 1:1 verification to eliminate the candidate match if the candidate match is not a true match when the matching system enrollment data records stored therein are associated with a reliable one of the biometric modalities,
   said server being further operable to
      compare the probe against the enrollment data records of the entire population by communicating with each of said matching systems associated with the row such that each of said matching systems associated with the row conducts a 1:N identity match, for the respective subpopulation, between the probe and the matching system enrollment data records stored therein,
      store at least one candidate match in a queue when the at least one candidate match is confirmed, and
      communicate the queue to an entity executing the identity match.

8. A system in accordance with claim 7, said server being further operable to:
   determine whether each matrix entry is compatible with one of a plurality of biometric modality matching algorithms;
   associate each matrix entry with a compatible one of the biometric modality matching algorithms; and
   associate each matrix entry associated with a compatible one of the biometric modality matching algorithms with an additional biometric modality matching algorithm.

9. A system in accordance with claim 8, said server system being further operable to:
   associate each matrix entry associated with a compatible one of the biometric modality matching algorithms, when the compatible one of the biometric modality matching algorithms is based on a reliable biometric modality, with one of said matching systems that includes the compatible one matching algorithm such that said one matching system is operable to conduct the 1:N identity match based on the reliable biometric modality; and
   associate each matrix entry that is incompatible with biometric modality matching algorithms when the biometric matching algorithms are based on the reliable biometric modality, with one of said matching systems that includes an algorithm for conducting parallel fusion.

10. A system in accordance with claim 8, wherein each of said matching systems associated with a matrix entry associated with a compatible one of the biometric modality matching algorithms is further operable to conduct the 1:1 verification with the additional biometric modality matching algorithm.

11. A system in accordance with claim 7, said server being further operable to:
   establish a hierarchy of the biometric modalities;
   determine categories of quality for biometric data, wherein the categories include high quality data, low quality data and unavailable data; and
   establish a sub-hierarchy for each biometric modality included in the hierarchy based on the categories.

12. A system in accordance with claim 11, said server being further operable to subdivide the entire population into the plurality of subpopulations by associating each individual included in the entire population with a respective category included in the sub-hierarchy.

13. A method in accordance with claim 11, said server is further operable to assign subpopulation designations to each of the plurality of subpopulations.

14. A method of conducting biometric identification matching comprising:

dividing an entire population into subpopulations;
generating a matrix including a plurality of matrix entries;
associating each of the matrix entries with one of the subpopulations and with one of a plurality of matching systems that corresponds to the one subpopulation;
obtaining biometric data, including the obtained biometric data in a probe, and determining a row in the matrix corresponding to characteristics of the probe;
conducting a 1:N identity match between the probe and each subpopulation using the one matching system corresponding to each subpopulation;
determining a candidate match when the probe matches a matching system enrollment data record in the corresponding one matching system;
storing the candidate match in a queue; and
communicating the queue to an entity requiring the identity match.

15. A method in accordance with claim 14, said storing operation comprising:
sequentially evaluating the candidate match in a 1:1 verification to eliminate the candidate match if the candidate match is not a true match; and
storing the candidate match in the queue when the candidate match is confirmed.

16. A method in accordance with claim 14, said generating a matrix operation further comprising:
determining whether each matrix entry is compatible with one of a plurality of biometric modality matching algorithms;
associating each matrix entry with a compatible one of the biometric modality matching algorithms; and
associating each matrix entry associated with a compatible one of the biometric matching algorithms with an additional biometric modality matching algorithm.

17. A method in accordance with claim 16, said associating each of the matrix entries with one of the plurality of matching systems operation comprising:
associating each matrix entry associated with a compatible one of the biometric modality matching algorithms, when the compatible one of the biometric modality matching algorithms is based on a reliable biometric modality, with one of the matching systems that includes the compatible biometric modality matching algorithm for executing said conducting a 1:N identity match operation based on the reliable biometric modality; and
associating each matrix entry that is incompatible with the biometric modality matching algorithms, when the biometric matching algorithms are based on the reliable biometric modality, with one of the matching systems that includes a parallel fusion algorithm for executing said conducting a 1:N identity match operation.

18. A method in accordance with claim 16, further comprising executing said conducting a 1:1 verification operation with the additional biometric modality matching algorithm.

19. A method in accordance with claim 14, said dividing operation comprising:
establishing a hierarchy of biometric modalities;
determining categories of quality for biometric data, wherein the categories include high quality data, low quality data and unavailable data; and
establishing a sub-hierarchy for each biometric modality included in the hierarchy based on the categories.

20. A method in accordance with claim 19, said dividing operation further comprising subdividing the entire population into the plurality of subpopulations by associating each individual included in the entire population with a respective category included in the sub-hierarchy.

* * * * *